United States Patent [19]

Wagner

[11] Patent Number: 4,740,026
[45] Date of Patent: Apr. 26, 1988

[54] SECUREMENT FIXTURE FOR TRUCK BED LINER

[75] Inventor: James A. Wagner, Elkhart, Ind.
[73] Assignee: LRV Corporation, Elkhart, Ind.
[21] Appl. No.: 853,905
[22] Filed: Apr. 21, 1986
[51] Int. Cl.⁴ ............................................ B60D 33/02
[52] U.S. Cl. .................................. 296/39 R; 403/348
[58] Field of Search ................... 296/39 R; 403/348; 292/202, DIG. 38, 240, 241; 24/671, 672, 621, 590

[56] References Cited

U.S. PATENT DOCUMENTS

| 2,605,374 | 7/1952 | Batcheller | 24/671 |
| 3,956,803 | 5/1976 | Leitner | 24/221 R |
| 4,333,678 | 6/1982 | Munoz et al. | 296/39 R |
| 4,572,568 | 2/1986 | Kapp et al. | 296/39 R |
| 4,599,768 | 7/1986 | Doyle et al. | 24/590 |
| 4,659,133 | 4/1987 | Gower | 296/39 R |

Primary Examiner—Robert B. Reeves
Assistant Examiner—Carol L. Olson
Attorney, Agent, or Firm—Thomas J. Dodd

[57] ABSTRACT

A truck bed liner securement fixture is provided. The fixture includes a lock member having a bevelled lower part which contacts a downturned inner portion of the truck bed side wall to secure the liner to the bed. An actuator pin allows the lock member to be rotated into a locked position after installation.

6 Claims, 6 Drawing Sheets

SECUREMENT FIXTURE FOR TRUCK BED LINER

FIELD OF THE INVENTION

This invention relates to securement fixtures and will have special application to securement fixtures for protective truck bed liners.

BACKGROUND OF THE INVENTION

Liners for pick up truck beds have become popular in recent years as an inexpensive means of protecting the bed from scratches, dents, etc. By protecting the bed from potential damage and/or disfigurement, the aesthetic value and, perhaps, the trade-in value of the pick up truck was enhanced. Several methods and devices for securing the liner in position during bed use have previously been tried. Commonly used are screw-like fasteners which extend through the liner and one of the truck bed side walls or inturned side wall flanges, as shown in U.S. Pat. Nos. 4,333,678; 4,181,349; and my U.S. patent application, Ser. No. 596,670, filed Apr. 4, 1984 now U.S. Pat. No. 4,595,112. Other securing methods involve the use of mounting brackets secured to the truck bed side walls and snap-in truck bed liners. The major drawbacks of these previous securement devices was that invariably, holes had to be drilled into the truck bed which lowered aesthetic appeal when the liner was removed as well as promote rusting due to water leakage through the holes in the bed. The securement fixture disclosed in my application Ser. No. 596,670, referred to above, eliminated the need for drilling holes in the truck bed, but was difficult to properly install in a completed liner.

SUMMARY OF THE INVENTION

The liner securement fixture of this invention provides for solid securement of the liner to the truck bed without the need to drill holes through the truck bed. The fixture includes a lock member which is inserted through a hole in the liner and an actuator part which causes the lock member to rotate until a bevelled lower part of the lock member cams into contact with a flange of the bed side wall to secure the liner in position.

Accordingly, it is an object of this invention to provide a novel securement fixture which is for a pick up truck bed liner.

Another object of this invention is to provide for a truck bed liner securement fixture which preserves the aesthetic appearance of the bed and liner.

Another object of this invention is to provide for a truck bed liner securement fixture which is efficient and economical.

Another object of this invention is to provide for a truck bed liner securement fixture which securely holds the liner in position during liner use.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 6:
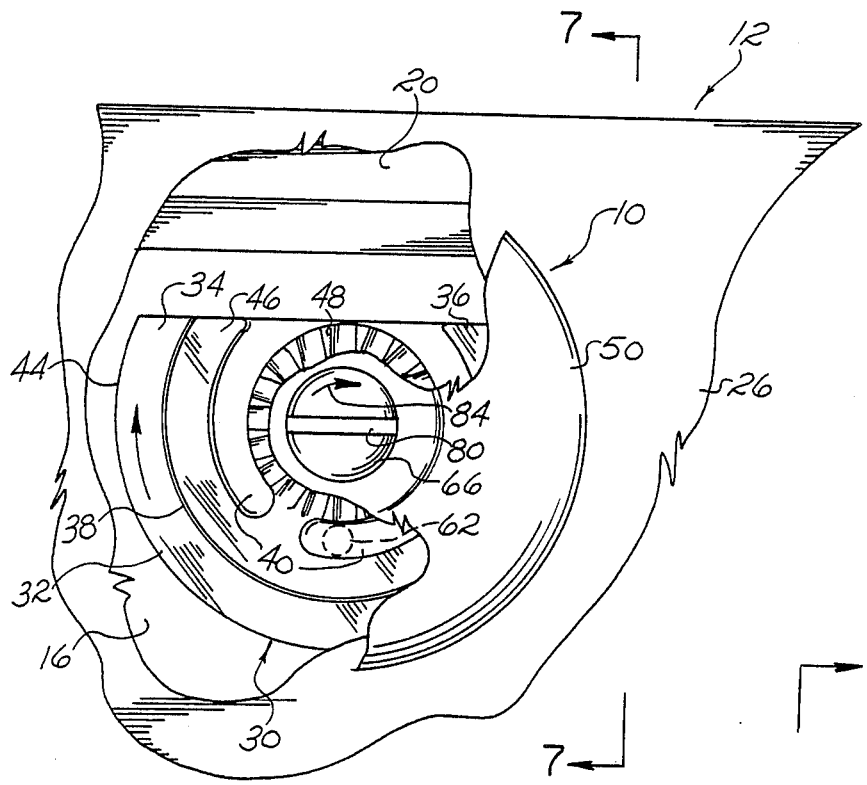
FIG. 6 is a fragmentary plan view of the fixture and liner shown in the unlocked position as seen generally from line 6—6 of FIG. 7.
Figure 9:
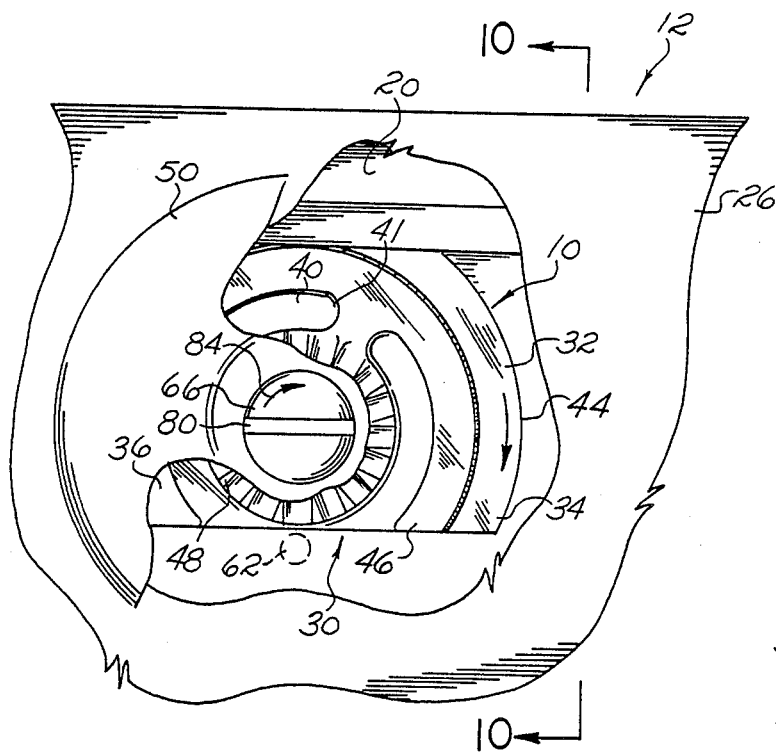
FIG. 9 is a fragmentary plan view of the fixture and liner as seen from line 9—9 of FIG. 10 similar to FIG. 6, but showing the fixture in an intermediate position.
Figure 10:
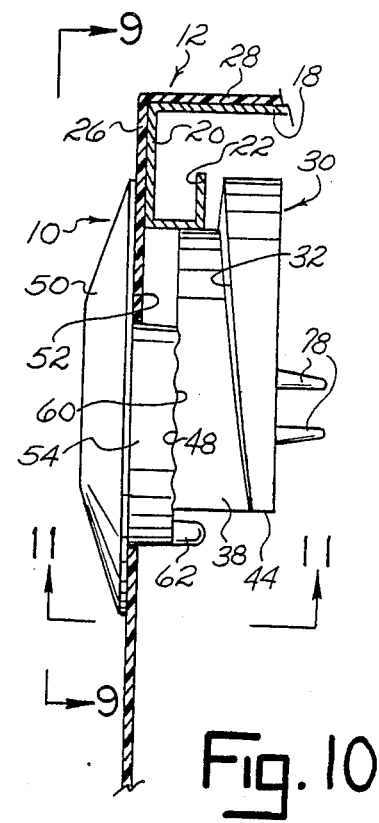
FIG. 10 is a sectional view taken along line 10—10 of FIG. 9.
Figure 11:
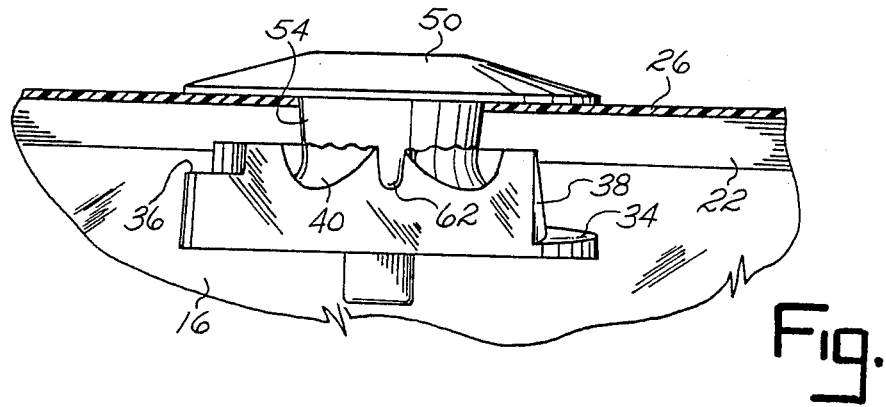
FIG. 11 is a cross-sectional view taken along line 11—11 of FIG. 10.
Figure 12:
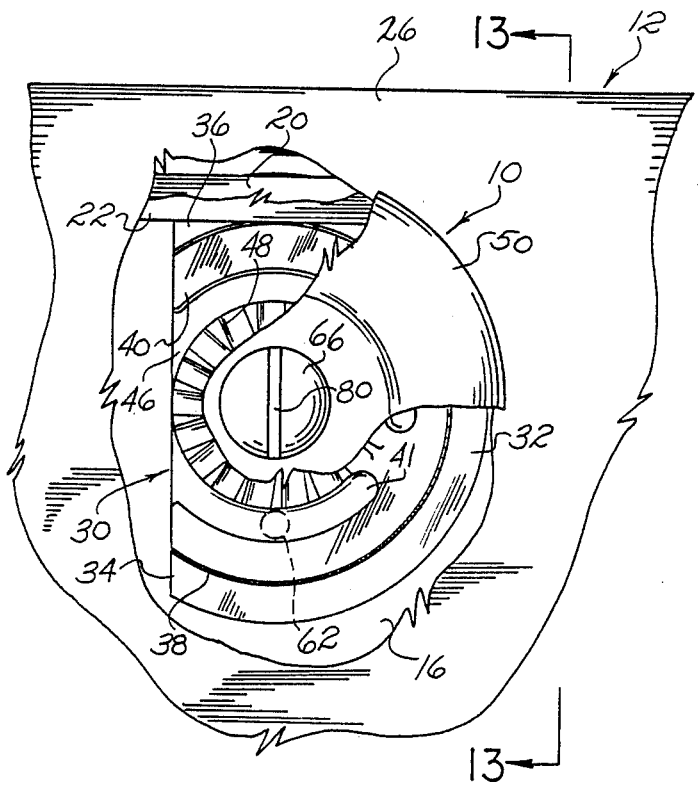
FIG. 12 is a fragmentary plan view of the fixture and line as seen from line 12—12 of FIG. 13 showing the fixture in the locked position.

Referring now to the drawings, the reference numeral 10 refers generally to a securement fixture which is shown in use securing a liner 12 to a truck bed 14. Truck bed 14 is generally defined by upstanding walls 16 which terminate in an inturned flange 18. A downturned flange 20 extends integrally from each inturned flange 18 and terminates in a generally L-shaped flange 22 as shown in FIGS. 6, 9, and 12. Liner 12 generally includes a portion 24 which covers the floor of bed 14 and integral upstanding walls 26 which terminate in an outturned lip 28 and serve to overlie and protect the bed walls 16 and their flanges 18, 20 and 22.

Securement fixture 10 preferably includes a lock member 30 of the semicircular shape shown. Lock member 30 includes a bevelled lower part 32 which varies in thickness from one end 34 to the other end 36. Lock member 30 also includes an integral upper part 38 in which is formed a non-continuous race or groove 40. Lock member parts 32 and 38 include a generally square bore 42 extending completely through lock member 30, whose center is equidistantly spaced from the outer edge 44 of the circular shaped portion of the lock member. Lock member upper part 38 includes an outer exposed face 46 which includes serrations 48 cut thereinto in a circular pattern between race 40 and bore 42.

Fixture 10 also includes a positioning part 50 of the generally circular shape shown. Positioning part 50 has a generally smooth lower face 52 which has a subttantially pear-shaped projection 54 thereon. A generally circular bore 56 extends through positioning part 50 and may include an internal shoulder 58 as shown. Projection 52 includes exposed serrations 60 thereon which are complemental with serrations 48 of lock member 30, and serve to prevent relative rotation of the lock member and positioning part in a selected direction. A pin 62 extends from projection 54 and is fittable in lock member race 40.

Securement fixture 10 also includes an actuator pin 64. Pin 64 includes a head 66 which fits into the enlarged portion 68 of positioning part bore 56 above shoulder 58 and a generally round shank 70 which is restrictively fitted within circular bore 56. Head 66 includes a slot 80 which allows pin 64 to be turned manually with the use of a tool. A shank part 72 extends integrally from shank 70 and complementally fits within lock member bore 42 to allow concurrent rotation of pin 64 and lock member 30 relative to positioning member 50. As shown in the drawings, bore 42 is square in shape, so shank part 72 will necessarily be square, but other shapes which allow concurrent rotation are feasible within the teachings of this invention. As shown, shank 72 includes a split 74 to form individual leg parts 76 each of which includes a terminal hooked foot 78. Shank part 72 is formed of resilient material, such as resilient plastic to allow feet 78 to secure pin 64 to lock member 30.

Figure 1:
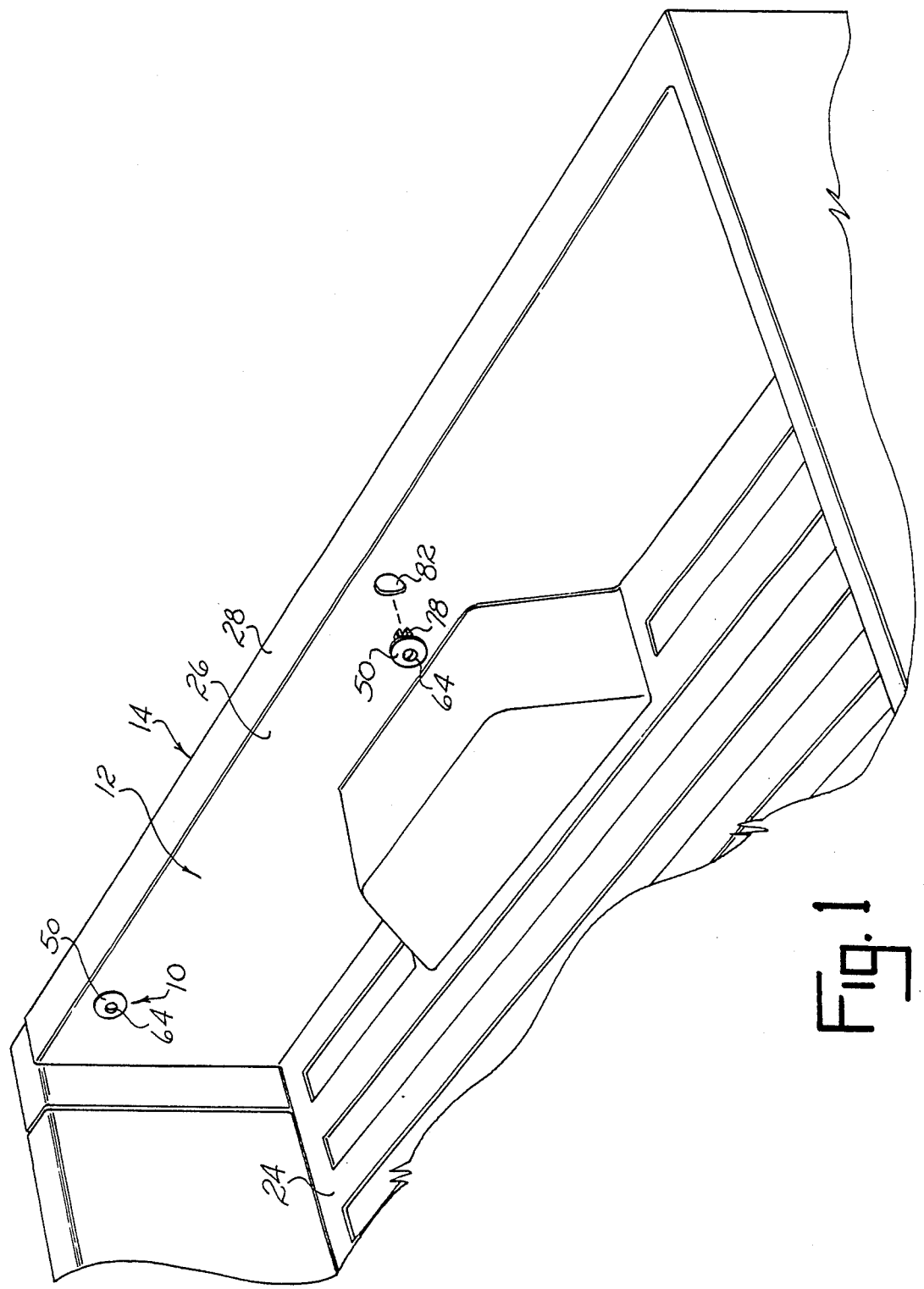
FIG. 1 is a fragmentary perspective view of a truck bed shown equipped with a liner and securement fixtures as taught by this invention.
Figure 2:
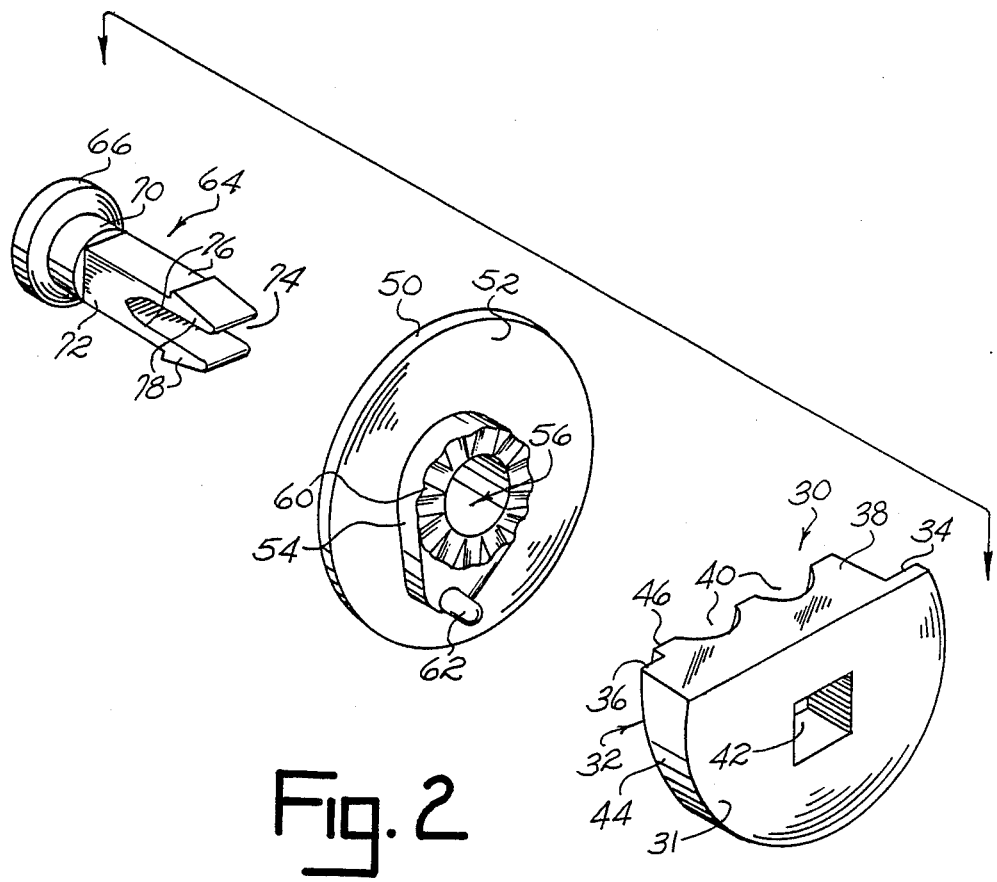
FIG. 2 is a rear exploded view of the components of the securement fixture.
Figure 3:
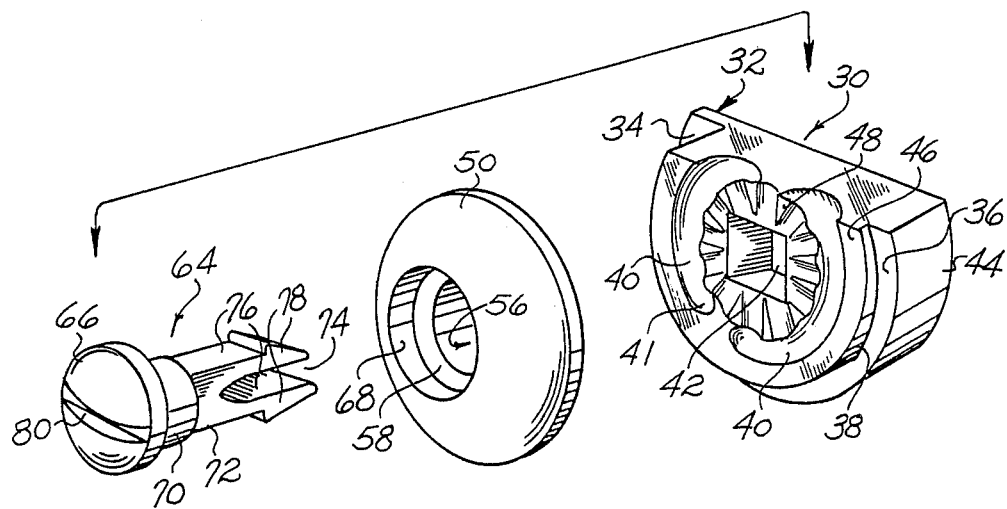
FIG. 3 is a front exploded view of the components of the securement fixture.
Figure 5:
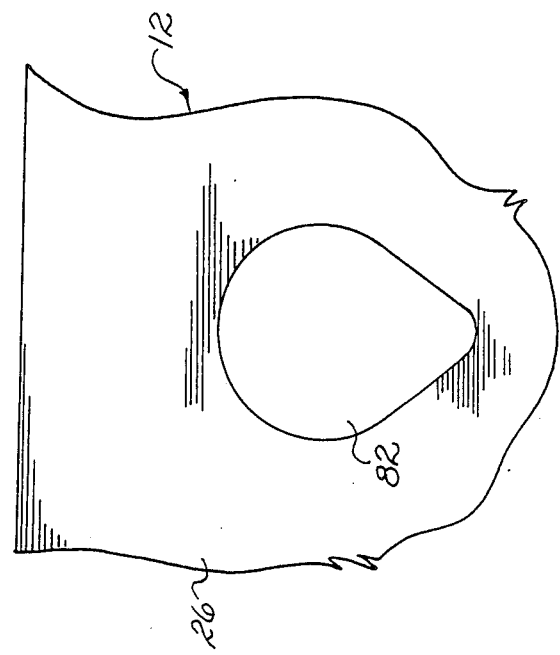
FIG. 5 is a fragmentary plan view of the liner after preparation to receive the fixture.
Figure 4:
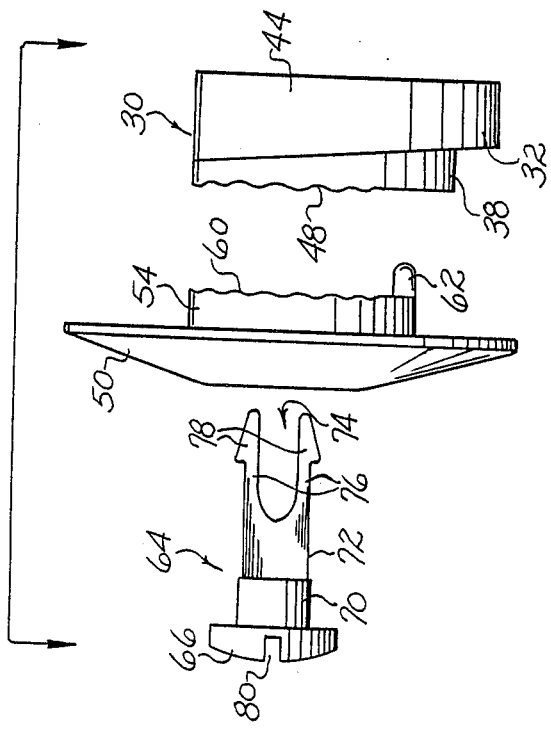
FIG. 4 is an exploded view of the fixture components in side elevation.
Figure 7:
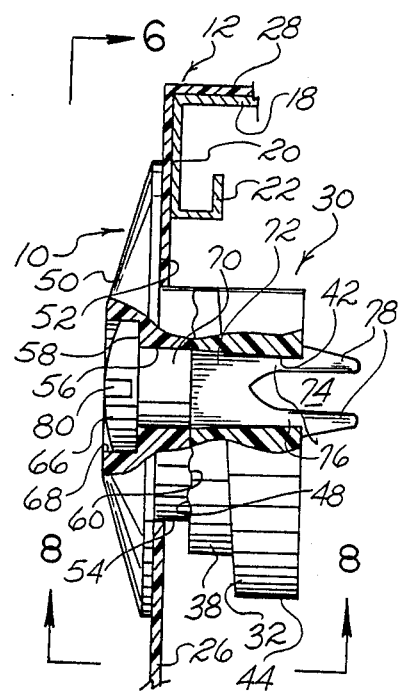
FIG. 7 is a fragmentary sectional view taken along line 7—7 of FIG. 6, and also depicts portions of the fixture in section form for purposes of illustration.
Figure 8:
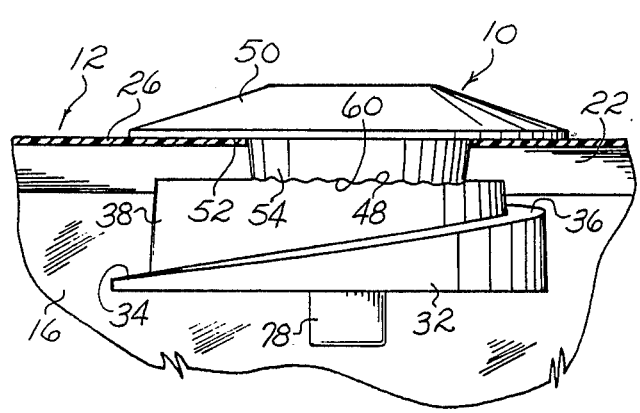
FIG. 8 is a fragmentary cross-sectional view taken along line 8—8 of FIG. 7.

Securement fixture 10 is utilized as follows. It should be understood that while several fixtures 10 may be required to secure liner 12 to the truck bed 14, the installation procedure will be identical for all fixtures of this type. A pear-shaped (or other shape depending on the shpae of positioning part 50) hole 82 is bored through liner wall 26 just under the lowest edge of the bed L-flange 22 (see FIG. 5). Fixture 10 is then assembled by positioning lock member 30 and positioning part 50 in face to face contact at their serrated faces 48, 60 with position pin 62 in race 40 as shown in FIG. 6. Actuator pin 64 is then pushed through the bores 56, 42 until hooked feet 78 clear the lower face 31 of lock member 30. At this time, the resiliency of parts 76 urges the hooks outwardly as shown in FIG. 7 to secure actuator pin 64 to the lock member. The fixture 10, thus assembled, is inserted into hole 82 in the position shown in FIGS. 6-8, with positioning part face 52 overlying and contacting liner wall 26.

Figure 13:
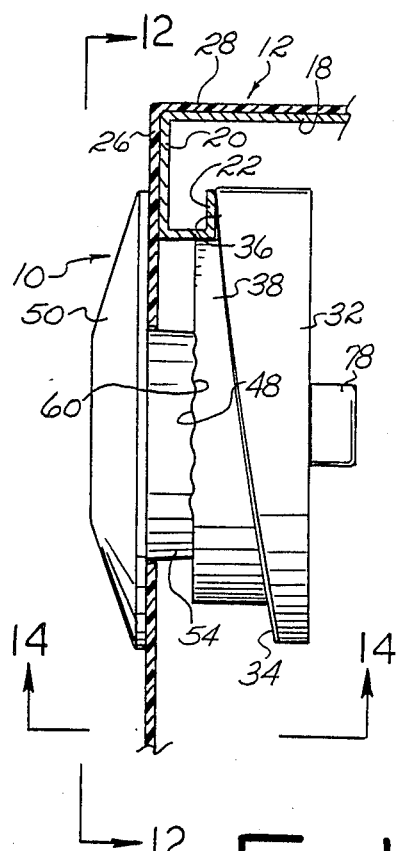
FIG. 13 is a sectional view taken along line 13—13 of FIG. 12.
Figure 14:
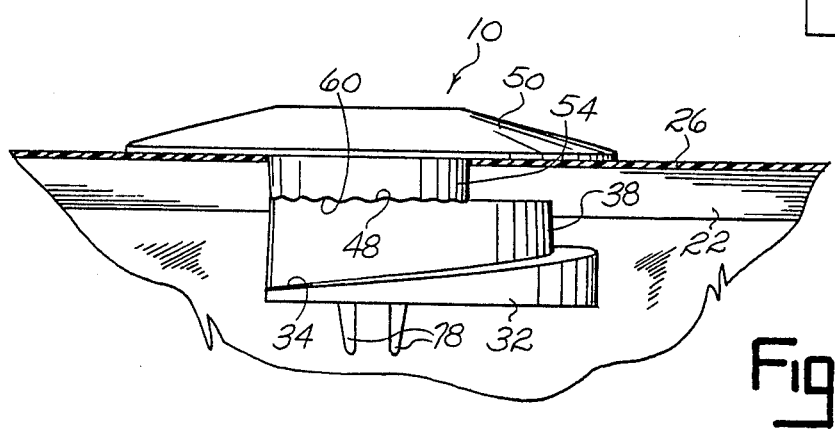
FIG. 14 is a fragmentary cross-sectional view taken along line 14—14 of FIG. 13.

Actuator pin 64 is then turned in the direction of arrow 84 by a screwdirver or other tool (not shown) inserted into head slot 80. The connection of lock member 30 to actuator pin 64 by shank part 72 in square bore 42 causes concurrent rotation of the lock member and the actuator pin relative to positioning part 50. Actuator pin 64 is turned in this fashion until the high end 36 of lock member bevelled part 32 is cammed into compressive contact with bed L-flange 22 as shown in FIG. 13. In this position, fixture 10 secures liner 12 to the truck bed 14 against movement of the liner. Serrations 48, 60 prevent reverse rotation of the lock member 30 to the unlocked position of FIG. 6. Positioning pin 62 and race terminal end 41 prevent overrotation of actuator pin 64 to assure firm locking of fixture 10 to bed flange 22.

It is understood that the invention is not limited to the scope of the above-given details, but may be modified within the scope of the appended claims.

I claim:

1. In combination, a securement fixture and a truck bed liner, said liner overlying a truck bed having upstanding walls, inturned flanges extending from said truck bed walls, and a downturned flange extending from said wall inturned flange, said liner including upstanding walls spaced from said bed side walls, said liner walls terminating in a lip portion adjacently overlying said inturned flange, said securement fixture comprising a lock member positioned adjacent said liner side wall between the liner side wall and said bed side wall, said lock member including a lock part adapted for contacting said downturned flange, and an actuation part connected to said lock member part and extending through said liner side wall, said acutation part operatively connected to said lock member wherein said lock member is shiftable between an unlocked position spaced from said downturned flange, and a locked position with said lock member part contacting said bed downturned flange to seucre the liner to the bed, said actuation part including a positioning part overlying said liner side wall and having a projection extending through said liner side wall and contacting said lock member, and an actuator pin extending freely through said positioning part and interlockingly connected to said lock member wherein rotation of the actuator pin causes corresponding rotation of the lock member relative to the positioning part.

2. The combination of claim 1 wherein said lock member part includes a bevelled face contacting said wall downturned flange when in the locked position, said lock member including a serrated upper face spaced from said bevelled face, and said positioning part located adjacent said liner wall spaced from said truck bed downturned flange and including a serrated lower face communicating with said lock member upper face to prevent relative rotation of said lock member to said positioning part towards said unlocked position.

3. The combination of claim 2 wherein said lock member upper face includes a semi-circular groove therein, said positioning part includes a locator pin positioned in said groove, said pin and groove constituting stop means for limiting rotation of said lock member towards it locked position.

4. The combination of claim 1 wherein said lock member includes a generally square bore therethrough, said positioning part including a generally circular bore therethrough in alignment with said lock member bore, said actuator pin including a head rotatably positioned in said positioning part bore, and a generally square shank positioned in said lock member bore, and means integral with said shank spaced from said lock member bore for securing said actuator pin to said lock member.

5. The combination of claim 4 wherein said actuator pin shank includes first and second longitudinally separated shank parts formed of resilient material wherein the first and second shank parts compressively engage an inner wall of said lock member bore, said securing means including a hook part extending outwardly of said lock member bore when said shank is positioned therein.

6. The combination of claim 1 wherein said lock member part includes a camming face which compressively engages said bed downturned flange as the lock member is shifted by said actuation member from its said unlocked position to its said locked position.

* * * * *